Oct. 10, 1961  G. H. DRUTCHAS  3,003,423
PRESSURE CONTROL VALVE
Filed July 11, 1957
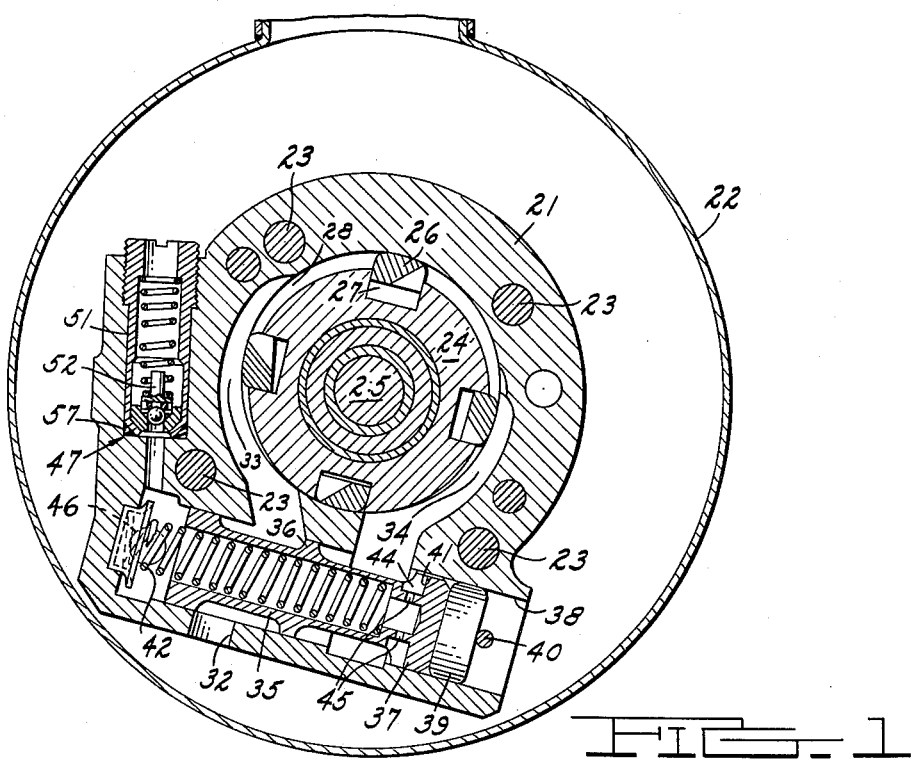
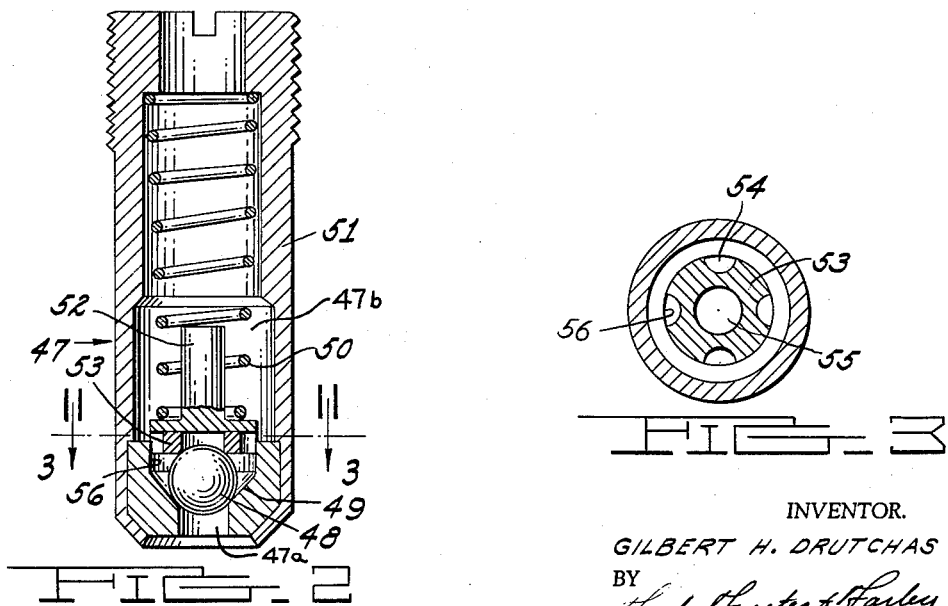
INVENTOR.
GILBERT H. DRUTCHAS
BY
Harley Forster & Harley
ATTORNEYS

United States Patent Office 3,003,423
Patented Oct. 10, 1961

3,003,423
PRESSURE CONTROL VALVE
Gilbert H. Drutchas, Detroit, Mich., assignor, by mesne assignments, to Thompson Ramo Wooldridge Inc., Cleveland, Ohio, a corporation of Ohio
Filed July 11, 1957, Ser. No. 671,268
8 Claims. (Cl. 103—42)

This invention pertains to a pressure control valve of the ball check type and particularly to means for preventing flutter or hunting of the valve at opening pressures.

There is a tendency for a ball check valve of the kind that unloads a hydraulic system when a predetermined pressure has been reached, to hunt or flutter when that pressure is reached, thereby causing a disturbing, objectionable noise as the valve repeatedly hits against its seat. This noise is especially objectionable when used in the motor vehicle pumping system, such as a power steering pump. The embodiment of this invention which is shown below for eliminating the objectionable noise from valve hunting is in a pump of the type which can be used for motor vehicle power steering. This invention is shown below in combination with a ball check type of valve and comprises a scalloped washer which is placed between the ball and the spring which urges the ball against its seat. The inner diameter of the washer fits against the ball while the outer diameter fits against an enlarged and inwardly extending portion of the ball seat, when the ball is in a closed or nearly closed position. The outer diameter of the washer is grooved to permit restricted flow between it and the enlarged seat portion when the ball is in a nearly closed position. This tends to slow and restrict movement of the washer, and hence the ball, since the resistance to fluid flow through the scallops must be overcome and this will, in effect, add to or subtract from the spring force respectively as the ball valve opens and closes, thereby preventing rapid reciprocations and hunting. The washer and enlarged portion of the ball seat may be axially proportioned to disengage when a large pressure is present in the hydraulic system, thereby providing a free flow to quickly relieve the pressure. The washer will then engage the enlarged seat portion to control the return of the ball to its seat.

It is, therefore, an object of this invention to provide a valve combination that resists hunting or valve flutter. Another object is to provide a quiet check valve operation. A further object is to increase the life of the check valve. A still further object is to provide a check valve with a controlled rate of opening and closing substantially insensitive to rapid pressure fluctuations but sensitive to the mean pressure of said fluctuation.

These and other objects will become more apparent when a preferred embodiment of this invention is described in connection with the drawing, in which:

FIGURE 1 is a sectional view of a slipper type pump having an embodiment of the valve dampening means of this invention;

FIGURE 2 is an enlarged valve cartridge embodying the dampening means of this invention; and FIGURE 3 is a section taken at 3—3 of FIGURE 2 showing the scalloped washer.

In FIGURE 1 is shown a power steering pump of the general type shown in copending application, Serial No. 490,288, filed February 24, 1955 in the name of William T. Livermore for Hydraulic Pump and Control Valve Assembly. Pump housing 21 is shown submerged in reservoir 22. Rotor 24 is driven in a clockwise direction about shaft 25 and has slipper type pumping elements 26 freely mounted in radial notches 27. Axis 25 is eccentric to chamber 28 which has a bore wall against which slippers 26 ride. Inlet 32 communicating with the reservoir feeds the intake port 33 which is recessed in housing 21 as is outlet port 34. Spool valve 35 is reciprocably mounted in bore 38 of housing 21 and is urged by spring 42 against stop 39 which is held in place by pin 40. A flat 41 is formed in the top portion of land 37 so that the output pressure in port 34 is conducted between spool valve 35 and stop 39. Output flow passes from port 34 through orifices 45, the center of valve 35 and then to outlet passage 46. In this manner, a controlled flow is provided since a pressure drop varying with the flow is present across orifices 45 and when the flow exceeds a predetermined rate, the pressure between land 37 and stop 39 will be enough greater than that at the outlet end to overcome spring 42 moving valve 35 and land 37 leftwardly allowing direct communication between inlet port 33 and outlet port 34 by-passing outlet 46. This will normally limit the pressure in port 34 to that required to meet flow requirements. Such operation is described in more detail in the above-mentioned application, Serial No. 490,288.

In communication with outlet 46 is check valve 47 having an inlet 47a, ball 48, ball seat 49, and spring 50 in cartridge 51. Cartridge 51 is fixed in housing 21 as shown in FIGURE 1.

If flow through outlet 46 becomes blocked, as in turning the steering wheel against limit stops, or otherwise becomes so restricted as to raise the pressure in outlet 46 above a predetermined maximum, ball 48 is lifted against spring 50 and fluid flows through cartridge 51 back into the reservoir thereby limiting the maximum pump pressure. Means for reducing or eliminating the hunting of ball 48 against seat 49 when the maximum pressure is reached are best shown in enlarged views of FIGURES 2 and 3. Headed pin 52 is inserted between washer 53 and spring 50 urging washer 53 against ball 48 and ball 48 against seat 49. FIGURE 3 shows the grooves 54 in the outer diameter of washer 53 which combined with the covering surface of the head of pin 52 permit only restricted fluid flow when washer 53 lies within the upper enlarged bore 56 of seat 49, the effective flow area through the washer grooves and past the head of pin 52 increasing with progressive displacement of the ball from its seat. Seat 49 is held securely in place by forming the ends of cartridge 51 inwardly after assembly. O ring 57 is placed between the front end of cartridge 51 and casing 21 to provide a seal therebetween. As an illustration of dimensional proportions which have proved completely satisfactory in overcoming relief valve noise in a typical open center power steering pump application, the embodiment disclosed employs a .019" diameter ball 48, a 90° seat leading from a .315" counterbore 56 to a .154" inlet passage 47a, a seated position of the ball with its upper extremity .020" below the upper edge of the counterbore, a .305" diameter washer .062" thick with four .062" radius grooves terminating .105" from the center of its .120" diameter opening 55, the washer extending approximately .022" above the upper edge of the counterbore in the closed postion shown in FIGURE 2 within an enlarged passage 47b having free flow dimensions relative to the washer.

In operation, when the pressure against ball 48 reaches a predetermined maximum, for example, 750 p.s.i., the ball will be lifted from seat 49 to permit discharge through a progressively increasing flow path and returned to seat 49 at a controlled rate due to the decreasing flow passages through washer 53 and the displacement of fluid through such flow passages necessary for return of the ball to its seat which tends to dampen out any rapid fluctuation in pressure in the system which would cause ball 48 to hunt or flutter. It will be noted that opening of the ball check valve and discharges therethrough is unrestricted due to the freedom of washer 53 to move above the counterbore, and that only the return of the ball to seated position is restricted.

While a preferred embodiment of my invention has been described above in detail, it will be understood that numerous modifications may be resorted to without departing from the scope of the following claims.

I claim:
1. A ball type fluid pressure relief valve characterized by an inlet passage terminating in a ball seat, a ball normally engaging said seat, a cylindrical flow passage communicating with said inlet passage extending past said ball having substantially free flow dimensions relative thereto, a cylindrical spring loaded washer operatively engaging said ball normally fitting closely within said cylindrical passage when said ball is seated, an enlarged passage communicating with and extending beyond said cylindrical passage of substantially free flow dimensions relative to said washer, and constantly open restricted passage means extending across said washer between said cylindrical and enlarged passages operative to only partially restrict without blocking flow past said washer whenever said ball returns from an open position to its seat.

2. A relief valve as set forth in claim 1 wherein said washer and enlarged passage are dimensioned to permit said ball and washer respectively to move to free flow positions within said cylindrical and enlarged passages in response to excessive inlet pressure and flow.

3. A relief valve as set forth in claim 1 wherein said restricted passage means comprise groove means extending across the edge of said washer.

4. A relief valve as set forth in claim 3 and means operatively associated with said washer for progressively restricting flow through said groove means as said ball progressively returns to its seat.

5. A relief valve as set forth in claim 4 wherein said next to the last means comprises a cap extending over said groove means operative to reduce the effective restricted passage area between said cylindrical and enlarged passages as said ball progressively returns toward its seat.

6. A relief valve as set forth in claim 5 wherein said cap is positioned to provide a predetermined restricted passage opening when said ball is seated, and an increasing restricted passage opening as the ball moves progressively off of its seat.

7. In a positive displacement hydraulic pump assembly having flow control valve means for normally maintaining a predetermined delivery flow rate and directly returning to pump intake any pump discharge in excess of said flow rate, relief valve means for limiting pump discharge pressure, said relief valve means being characterized by an inlet passage terminating in a ball seat, a ball normally engaging said seat, a cylindrical flow passage communicating with said inlet passage extending past said ball having substantially free flow dimensions relative thereto, a cylindrical spring loaded washer operatively engaging said ball normally fitting closely within said cylindrical passage when said ball is seated, an enlarged passage communicating with and extending beyond said cylindrical passage of substantially free flow dimensions relative to said washer, and constantly open restricted passage means extending across said washer between said cylindrical and enlarged passages operative to only partially restrict without blocking flow past said washer whenever said ball returns from an open position to its seat.

8. Relief valve means as set forth in claim 7 wherein said restricted passage means comprise groove means extending across the edge of said washer and cap means extending across said groove means positioned to provide a progressively decreasing effective restricted passage through said groove means as the ball returns from an open position to its seat.

References Cited in the file of this patent

UNITED STATES PATENTS

| | | |
|---|---|---|
| 1,091,980 | Steinberg | Mar. 31, 1914 |
| 1,550,756 | Sturtevant | Aug. 25, 1925 |
| 1,976,151 | Thaheld | Oct. 9, 1934 |
| 2,103,673 | Hoferer | Dec. 28, 1937 |
| 2,163,313 | Voit | June 20, 1939 |
| 2,541,395 | Wilson | Feb. 13, 1951 |
| 2,564,815 | Raymond | Aug. 21, 1951 |
| 2,699,179 | Hansen et al. | Jan. 11, 1955 |
| 2,704,549 | Strnad | Mar. 22, 1955 |
| 2,742,862 | Banker | Apr. 24, 1956 |
| 2,759,423 | Keel | Aug. 21, 1956 |
| 2,793,656 | Frain et al. | May 28, 1957 |
| 2,804,825 | Mansfield et al. | Sept. 3, 1957 |
| 2,818,813 | Pettibone et al. | Jan. 7, 1958 |
| 2,827,854 | Huber | Mar. 25, 1958 |

FOREIGN PATENTS

| | | |
|---|---|---|
| 104,885 | Sweden | June 30, 1942 |
| 444,346 | Great Britain | Mar. 19, 1936 |